H. A. SCHILLING.
ANGLE SPREADER AND SWIVEL.
APPLICATION FILED JUNE 17, 1916.

1,227,325.

Patented May 22, 1917.

WITNESSES:

INVENTOR
Henry A. Schilling

UNITED STATES PATENT OFFICE.

HENRY A. SCHILLING, OF BROOKLYN, NEW YORK.

ANGLE-SPREADER AND SWIVEL.

1,227,325.  Specification of Letters Patent.  Patented May 22, 1917.

Application filed June 17, 1916.  Serial No. 104,348.

*To all whom it may concern:*

Be it known that I, HENRY A. SCHILLING, a citizen of the United States, and a resident of the city of New York, borough of Brooklyn, in the county of Kings and State of New York, have invented a new and Improved Angle - Spreader and Swivel, of which the following is a full, clear, and exact description.

Among the principal objects which the present invention has in view are: to exert a straight line pull on the lure and parts of the spreader and swivel under all service conditions; to avoid entangling the fishing tackle; to avoid stresses on the parts of the tackle transverse thereto; and to secure the desired service arrangement of the parts of the tackle at the completion of a cast.

Drawings.

Figure 1:
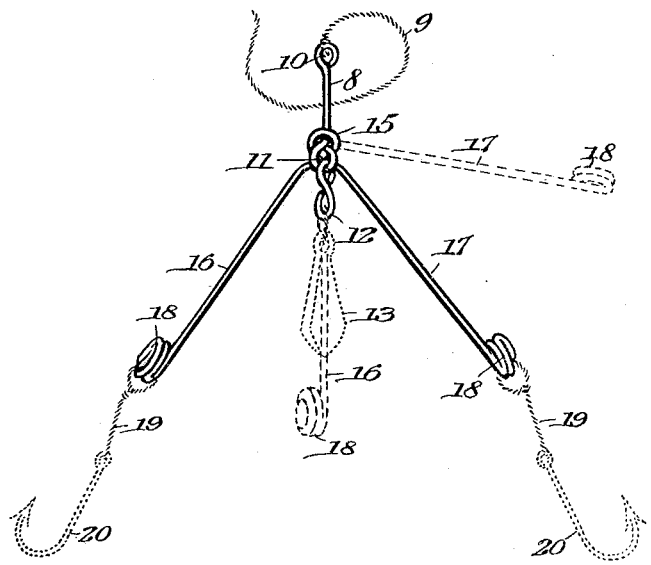
Figure 1 is a view of a spreader and swivel therefor constructed and arranged in accordance with the present invention, the dotted lines employed in said figure showing the position of the spreader when the fish is caught on the hook attached to one leg of said spreader.

Description.

As shown in the drawings, the swivel 8 is attached in service to a line 9 of conventional construction. The swivel has at one end an eyelet 10 to receive the said line and at the opposite end an eyelet 11 to receive a link 12 to which is secured in service a sinker 13.

Figure 3:
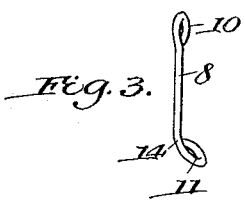
Fig. 3 is a detail view showing the swivel embodied in the present invention.

As shown best in Fig. 3 of the drawings, the eyelet 13 is arranged in a plane angularly disposed to the straight bar of the swivel 8. To secure this arrangement the bar 8 is bent at the point 14 close to the eyelet 11. In service, the bend or point 14 is the resting place of the eyelet 15 on the spreader supported by the link 8.

The spreader above referred to is constructed from suitable metallic wire shaped at the center to provide the eyelet 15. Outwardly spread from the eyelet 15 are the legs 16, 17 of the spreader. The legs 16, 17 are formed to a suitable length and are each provided at the extreme end thereof with a coiled eyelet 18 through which or in which is secured in service the lines 19 of hooks 20.

The eyelet 15 rests at the bend 14 and is supported by the eyelet 11. The said eyelet 15 is so arranged that the plane of said eyelet is angularly disposed to the plane to which both of the legs 16 and 17 approximate. This arrangement is best shown in Fig. 2 of the drawings.

The object in this arrangement is to secure as nearly as possible an alinement between the legs 16 and 17 and the straight bar of the link 8 when either of said legs is drawn to the position shown in Fig. 1 of the drawings by the dotted position of the leg 16. This is the position when a strike has taken the hook 20 connected with the leg 16.

If a strike has occurred on each of the hooks connected with both of the legs 16 and 17, and the strikes are of equal weight, the spreader will maintain the position shown by full lines in Fig. 1 of the drawings and the pull exerted on the swivel 8 and the line directly connected therewith will be the resultant of the two resistances, but will remain in line with the straight bar of said swivel.

Figure 2:
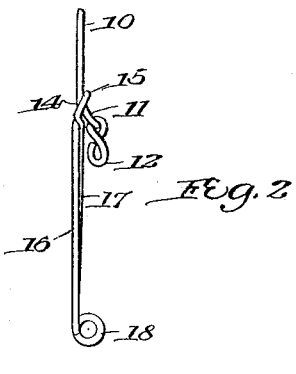
Fig. 2 is a side edge view of the swivel and spreader constructed and arranged in accordance with the present invention.

If when making a cast or when lowering the tackle to the water, the spreader should swing to the front of the swivel 8 and the eyelet 11 by reason of the bent portion 14 and the angular disposition of the eyelets 11 and 15, the spreader will swing to the position shown in Fig. 2 of the drawings, since the weight of the tackle is imposed upon the said spreader. In other words, the spreader can only rest in service relation to the swivel 8 in a position substantially that shown in Fig. 2 of the drawings.

Claims.

1. An apparatus as characterized comprising a spreader having a centrally disposed eyelet and a plurality of legs outwardly spread therefrom, said eyelet being arranged in a plane angularly disposed to the plane incorporating said legs; and a swivel pivotally connected with said spreader by means of said eyelet, said swivel having a straight bar portion and a portion arranged in a plane angularly disposed to said straight bar portion.

2. An apparatus as characterized comprising a spreader having a centrally disposed eyelet and a plurality of legs outwardly spread therefrom, said eyelet being arranged in a plane angularly disposed to the plane incorporating said legs, and a swivel pivotally connected with said spreader by means of said eyelet, said swivel having a straight bar portion and an eyelet at the extremity thereof arranged in a plane angularly disposed to said straight bar portion.

3. An apparatus as characterized comprising a swivel having a straight bar portion and eyelets at both ends thereof, one of said eyelets being disposed in a plane incorporating said straight bar portion and the other of said eyelets being arranged in a plane angularly disposed to a plane incorporating said straight bar portion, the point of deflection of said last-mentioned eyelet being approximately the junction of said eyelet and said straight bar portion.

4. An apparatus as characterized comprising a swivel having a straight bar portion and eyelets at both ends thereof, one of said eyelets being disposed in a plane incorporating said straight bar portion and the other of said eyelets being arranged in a plane angularly disposed to a plane incorporating said straight bar portion, the point of deflection of said last-mentioned eyelet being approximately the junction of said eyelet and said straight bar portion; in combination with a spreader having legs disposed in paired relation and flared from a centrally disposed integrally formed eyelet, said eyelet being arranged in a plane angularly disposed to a plane incorporating said legs.

5. An apparatus as characterized comprising a swivel having a straight bar portion and eyelets at both ends thereof, one of said eyelets being disposed in a plane incorporating said straight bar portion and the other of said eyelets being arranged in a plane angularly disposed to a plane incorporating said straight bar portion, the point of deflection of said last-mentioned eyelet being approximately the junction of said eyelet and said straight bar portion; in combination with a spreader having legs in paired relation and flared from a centrally disposed integrally formed eyelet, said eyelet being arranged in a plane angularly disposed to a plane incorporating said legs; and a link operatively connected with the angularly disposed eyelet of said swivel.

HENRY A. SCHILLING.

Copies of this patent may be obtained for five cents each, by addressing the "Commissioner of Patents, Washington, D. C."